United States Patent [19]

Loeber et al.

[11] 4,068,764
[45] Jan. 17, 1978

[54] REAR STEPPER ASSEMBLY FOR A PIPE HANDLING VEHICLE

[75] Inventors: Frederick W. Loeber, Downey; Louis Russo, Lawndale, both of Calif.

[73] Assignee: Ameron, Inc., Monterey Park, Calif.

[21] Appl. No.: 739,480

[22] Filed: Nov. 8, 1976

[51] Int. Cl.² ............................................ B66C 23/42
[52] U.S. Cl. .................................... 214/1 PA; 180/8 R
[58] Field of Search .............. 214/1 R, 1 H, 1 D, 1 P, 214/1 PA, 373, 394, 500, 501, 505, 512; 180/8 R, 8 B

[56] References Cited

U.S. PATENT DOCUMENTS

| | | | |
|---|---|---|---|
| 2,954,136 | 9/1960 | Butler et al. | 214/394 |
| 3,258,135 | 6/1966 | Bigge et al. | 214/1 PA |

FOREIGN PATENT DOCUMENTS

| | | | |
|---|---|---|---|
| 621,230 | 3/1961 | Italy | 214/1 PA |

*Primary Examiner*—Frank E. Werner
*Attorney, Agent, or Firm*—Christie, Parker & Hale

[57] ABSTRACT

A pipe transporting vehicle steps into a pipe, passes through the pipe, and exits at the opposite end to bring into the inside of the pipe a pipe carriage. The vehicle has a stepper assembly of a stanchion, a walking beam pivotally connected to the stanchion, an axle set at each end of the walking beam, and a support structure in telescopic receipt of the stanchion. Trunnions and gudgeons between the beam and axle sets permit oscillation of each axle set about a fore-and-aft axis of the stepper independently of the other to accommodate irregularities in the path of the vehicle transverse to the line of vehicle movement. The walking beam pivots through a large angle for the stepping function of the wheels and to accommodate irregularities in line of motion of the wheels. A sleeve of the support structure telescopically receives the stanchion. Vertical loads from the carriage of the vehicle and pipe are taken by the sleeve and transferred to the stanchion through elastomeric shock absorbers. Top and bottom vertical slide bearings between the stanchion and the sleeve take moments, torques and horizontal forces between the two and permit relative vertical motion between the two. A fore-and-aft, individually actuatable, push-pull hydraulic cylinder operates on each axle set to lift it individually to step into and out of a pipe.

22 Claims, 6 Drawing Figures

REAR STEPPER ASSEMBLY FOR A PIPE HANDLING VEHICLE

BACKGROUND OF THE INVENTION

The present invention relates to load carrying vehicles in general and more in particular to a vehicle capable of stepping its wheels so as to avoid bearing on fragile edges of objects in its path.

Huge pipe sections used in the likes of large water projects measuring 250 inches or so in diameter and weighing on the order of 200 tons must be transported to their permanent site. It has been the practice to use pipe laying vehicles for this purpose. Such a vehicle drives through the pipe and lifts the pipe from within it on a main frame or carriage of the vehicle. The carriage is between wheeled ends of the vehicle. The vehicle then transports the pipe to its desired location. The lips or edges of these pipes, as huge as the pipes are, are comparatively fragile and can fail if driven over by the tires of a pipe transporting vehicle. Accordingly it has been the practice to provide a stepper at one end of the vehicle to step the wheels into the pipe and out of the pipe without encountering the lips of the pipe. Such a construction is shown in U.S. Pat. No. 2,954,136 to Butler, Jobe, and Domis.

The stepper assemblies of previous pipe transporting vehicles have inadequate tire-to-ground bearing to support payloads on the order of 220 tons.

Previous vehicles have had difficulty in handling road imposed loads and this difficulty has resulted in comparatively low vehicle speeds. For example, galloping from resonance would occur at medium vehicle speeds. Additionally, shock resulting from movement of massive structure in response to irregularities in the path of the vehicle may severely load the structure and the pipe payload.

SUMMARY OF THE INVENTION

The present invention provides a stepper assembly for a pipe section transporting vehicle which enables an end of the pipe transporting vehicle to step into and out of pipe sections, which avoids wheels of the stepper from encountering the edge of the pipe, which avoids large road imposed loads and evenly distributes loads onto the wheels of the stepper.

Front and rear axle sets mount on the ends of a walking beam, which for its part mounts pivotally to a post or stanchion. During pipe transport and while not stepping, the axle sets are free to rise and fall with grade irregularities because of the pivotal mount. Slide bearing means between the stanchion and a sleeve of a support structure accept relative vertical movement of the stanchion with respect to the support structure while accommodating moments, torques, lateral and horizontal forces. Shock absorber means between the support structure and the stanchion absorb road generated energy and vertically load couple the support structure and stanchion. The support structure connects to a carriage which supports a pipe section from inside the section. The carriage is supported at the end opposite the stepper by wheel means of a prime mover. Lifting means, say a hydraulic cylinder, acts across the pivot between each end of the walking beam and the stepper to selectively lift either end of the beam up from the ground and to lift with it an axle set. For example, the rear axle means can be stepped to enter a pipe section. After entrance, these axle means are set on the inside of the pipe. The forward axle means can then be stepped to complete the entrance of the stepper into the pipe section. During these two stepping operations the lifted axle means and the balance of the stepper and its aliquot share of the load of the carriage are borne by the axle means which is not being stepped.

A preferred construction of the stepper of the present invention has a walking beam pivotally connected to a stanchion such that the walking beam is capable of considerable rotation about the pivot, say about 60°. The walking beam extends in either direction from this pivot and mounts axle means at its ends. Thus axle means straddle the pivot. Each end of the walking beam can be raised or lowered to step the axle means of the affected end of the beam. A pair of power cylinders between the stanchion and each end of the walking beam preferably constitute the lifting means. Each axle means preferably comprise a set of two wheels mounted on an axle assembly and through a trunnion to the walking beam. The trunnion permits oscillation of the axle sets through a small angle about the fore-and-aft axis of the stepper to accommodate transverse grade irregularities. The individual journaling of each axle set to the walking beam results in the potential of an angular displacement, oscillation, between the axle sets which is double the angular displacement of only one of the sets with respect to the walking beam. The stanchion to which the walking beam pivots receives a sleeve of support structure, preferably a monolithic weldment. Shock absorber means and load transferring means between the support structure and the stanchion transfer gravity and other vertical loads from the support structure to the stanchion. Slide bearings permit relative vertical motion between the stanchion and the support structure while accepting horizontal, lateral, torsional and moment loads between the two. The shock absorber and slide bearing means permit the stepping means for the axle means to be out of the load path of which the shock absorber and slide bearing means form a part. Thus, the stepping means need only be able to withstand stepping loads. The support structure extends forwardly to present a pair of arms spaced apart in the vertical for connection to tongues of the carriage. This connection permits rotation about the connections so that the stepper can be steered with respect to the carriage. Wings extend laterally from near the top of the support structure to present moment arms to steering means in the form of push-pull power cylinders between the carriage and the support structure. Push-pull actuation of these cylinders can steer the stepper and fix the angular position of the stepper with respect to the carriage.

The slide bearings have opposed heads bearing on the outside surface of the sleeve of the support structure to accommodate loading in a horizontal direction between heads transverse to the support structure. Loading in the other horizontal direction is taken between shanks of the bearings and the walls of vertical slots in the sleeve receiving the shanks. The slide bearings are tied together through cross shafts which locate on the sleeve so that the cross shaft and slide bearings fix the sleeve with respect to the stanchion except for vertical motion between the two. The slide bearings are in upper and lower pairs for a reaction couple to the loads which are imposed primarily by a pipe section being carried by the carriage and the carriage.

As previously mentioned, the support structure and stanchion cooperation load isolate the means for lifting or stepping the ends of the walking beam, so these means need not be built to withstand the considerable loads which they would have to bear if they were in load circuit between the carriage and the axle means. Isolation of these lifting means is further accomplished by mounting them to the support structure and to the walking beam through universal bearings. The shock absorber means are also mounted through universal bearings so that they can transmit and bear only vertical loads.

These and other features, aspects and advantages of the present invention will become more apparent from the following description, appended claims and drawings.

DESCRIPTION OF THE PREFERRED EMBODIMENTS

Figure 1:
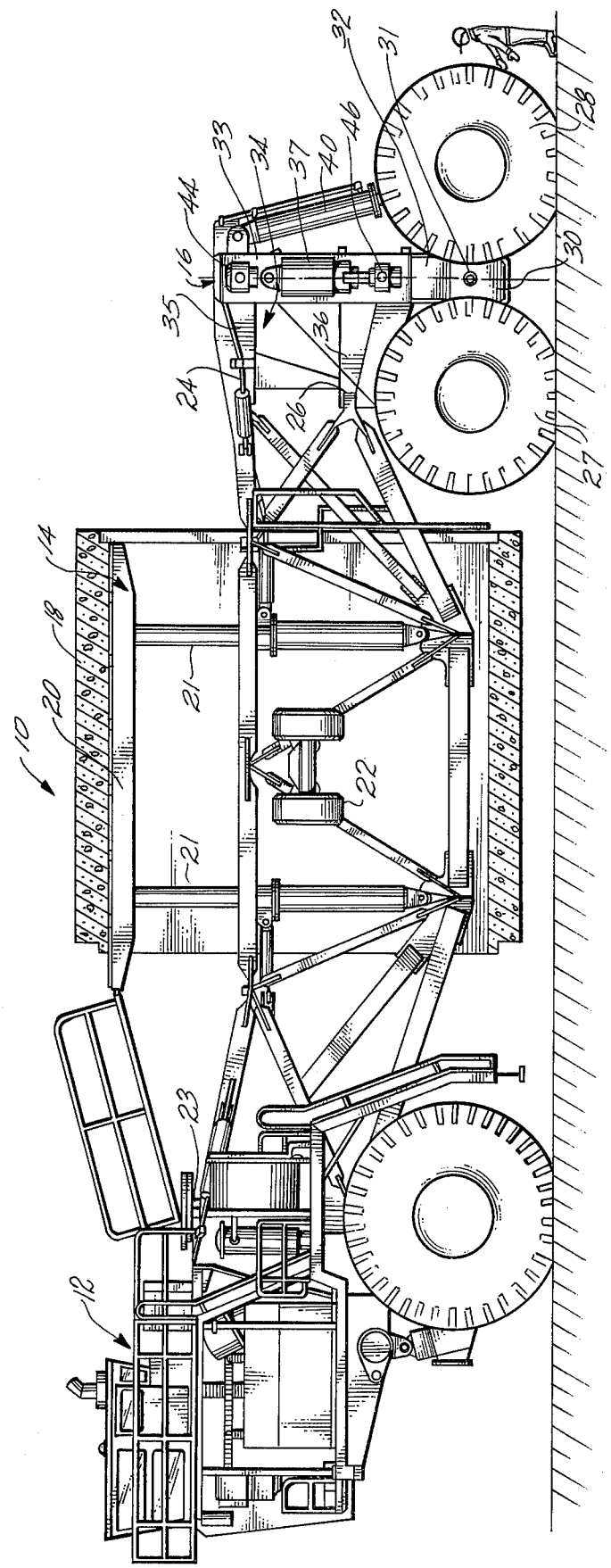
FIG. 1 is a side elevational view of a pipe transporting vehicle employing the stepper assembly of the present invention with a pipe shown in half section.

FIG. 1 illustrates a pipe transporting vehicle construction with a wheel stepper assembly in accordance with the present invention. An average stature man to the right of the vehicle shows the vehicle's size. There, the vehicle is shown by reference numeral 10. It has as a forward control and prime mover a propulsion unit 12. The vehicle also has a main frame in the form of a central pipe carriage assembly 14, and a rear stepper assembly 16. A pipe 18 is illustrated being carried by the carriage. The carriage has a pipe lift frame 20 for bearing on the inside wall of the pipe and lifting the pipe off the ground. The carriage includes hydraulic cylinders 21 which perform the actual lift. Pipe rotating and lateral stabilizer wheels 22 bear on the inside wall of the pipe to stabilize it laterally and perform a positioning function in rotating the pipe. An upper and lower articulating joint between the tractor and the carriage permits the prime mover to pivot about a vertical with respect to the carriage. The upper of these joints is shown at 23. The carriage can also pivot about a vertical with respect to the stepper through similar joints shown at 24 and 26.

The stepper has a front axle set 27 which includes forward wheels and a rear axle set 28 which includes rear wheels. Each set includes two wheels and means to mount the wheels on a walking beam 30. The walking beam pivots at 31 with respect to a stanchion 32 to which it is connected. Pivot 31 lies transverse to the fore-and-aft direction of the walking beam, which direction parallels the line of movement of the stepper assembly. The stanchion receives in a sleeve 33 of a massive support structure 34 in the form of a weldment. The receipt of the stanchion in the sleeve permits some vertical relative movement between the sleeve and the stanchion. Load from the carrier goes into the weldment through a pair of forward extending arms 35 and 36 of the weldment. The load is of the carriage and the pipe section it carries. Arms 35 and 36 directly couple to joints 24 and 26. The arms connect directly to sleeve 33 at their other ends. Vertical loads of the weldment and carriage transfer to the stanchion through shock absorber assemblies 37 and 38 (see FIG. 3 for the latter) located to either side of the stanchion and sleeve. These shock absorber assemblies connect at their upper ends to the sleeve and at their lower ends to the stanchion. Front and rear hydraulic cylinders 40 and 42 (the forward cylinder being shown in FIG. 2) operate to raise and lower the wheel sets separately by pivoting one set about pivot 31 while the other set stays on the ground to bear the load.

As previously mentioned, weldment 34 can move vertically with respect to stanchion 32. Upper and lower slide bearing sets 44 and 46 couple the weldment and stanchion so that the moments applied on arms 35 and 36 by carriage 14 and its load are reacted at the slide bearings and taken by the stanchion regardless of vertical movement of the weldment with respect to the stanchion. Moment loading in the opposite sense, as from road imposed loads or from lifting the rear wheel set, are taken by the weldment through these slide bearings. As will be developed subsequently, each wheel set can tilt about a fore-and-aft axis independently of the other wheel set. Rotation about transverse pivot 31 makes the wheel sets independent fore-and-aft. During transport of the pipe, both wheel sets are on the ground. All loads go through the stanchion to the wheel sets, none reaching the wheels through the hydraulic cylinders. "Road" loads on the stepper are small because the wheel sets can respond to irregularities in the terrain independently of one another. This independent suspension fore-and-aft and laterally allows the even application of vehicle load to the wheels regardless of normally encountered irregularities of terrain.

Briefly, when it is time to receive a section of pipe, the pipe transporting vehicle backs up to the section of pipe and rear hydraulic cylinder 40 actuates and lifts axle set 28 over the forward lip of the pipe. The vehicle then backs up a little bit so that this axle set is within the pipe. The axle set within the pipe is then set down by hydraulic cylinder 40 onto the inside surface of the pipe. Forward axle set 27 then lifts by the force of hydraulic cylinder 42. With the forward axle set up, the vehicle backs up still further so that the forward set of wheels enters the pipe. The forward axle set is then let down. The vehicle backs up yet further with both the wheels of both axle sets in contact with the inner wall of the pipe until the rear end of the pipe approaches. The procedure reverses to step out of the pipe so that both the wheels of both axle sets are placed on the ground without running over the rear lip of the pipe. The carriage can then lift the pipe and the vehicle can then transport the pipe. For placement of a pipe section in a section of previously laid pipe, the stepper steps into the laid section and steps back over a joint formed with the new section.

Figure 2:
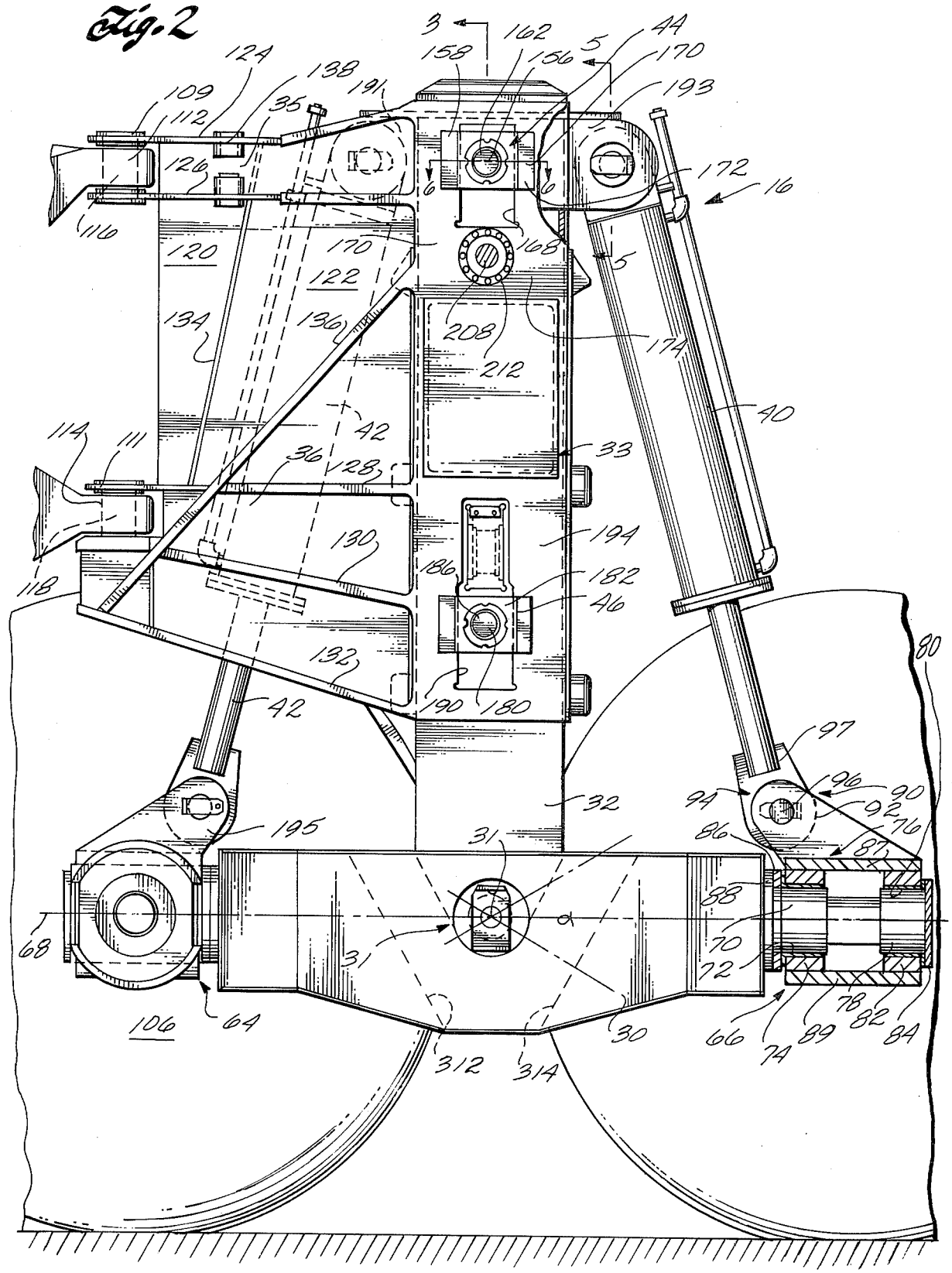
FIG. 2 is a side elevational view, partly fragmented and partly in section, illustrating the stepper assembly.
Figure 3:
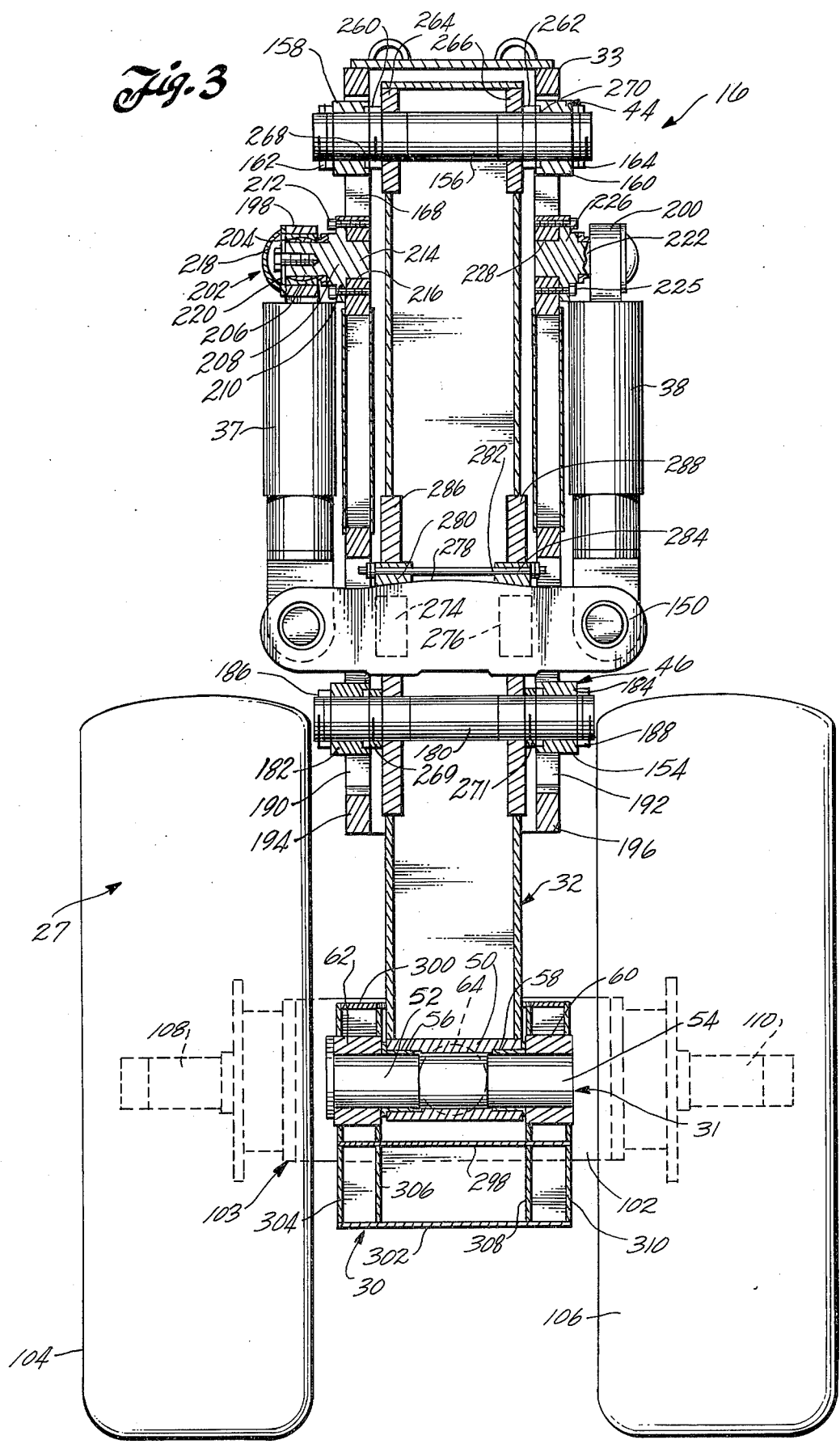
FIG. 3 is a view taken along lines 3—3 of FIG. 2 showing in vertical end elevation and cross section the stepper assembly of the present invention.

With this brief description, reference should be made to FIGS. 2 and 3 for the more detailed description which follows.

With reference to FIG. 3, walking beam 30 pivotally couples at pivot 31 to stanchion 32. This pivotally couples front and rear axle sets 27 and 28 to the stanchion.

The pivotal coupling occurs through a sleeve 50 of the stanchion which receives opposed and coaxial trunnions 52 and 54 of the walking beam. Bushings 56 and 58 between the trunnions and the sleeve provide smooth surface rotational bearings. Load rings 60 and 62 on trunnions 52 and 54 journal them and couple them directly to the walking beam. The load rings secure to the walking beam and provide load bearings between that beam and the trunnions.

With reference to FIG. 2, walking beam 30 mounts fore-and-aft trunnion assemblies 64 and 66, assembly 66 being typical of the two. These assemblies receive the axle sets and permit limited oscillation of these sets independently of each other about an axis through the length of the walking beam, the axis being shown at 68. Trunnion assembly 66 includes a major diameter journal 70 in receipt of a bushing 72, which in turn is received in a load block 74 of an axle assembly 76 of the wheel set. A journal 78 of minor diameter on the far end of trunnion 66 receives a bushing 80, which in turn receives in load block 82 of the axle assembly. A dust cover 84 closes the end of the assembly and closes the journal. A thrust bearing 86 between bushing 72 and an external annular flange 88 of trunnion 66 transfers loads acting along axis 68 towards pivot 31 into the walking beam. Load blocks 74 and 82 sandwich between upper and lower plates 87 and 89. An assembly of load blocks 74 and 82 and upper and lower plates 87 and 89 make up a rigid box beam which spans the distance between wheels of an axle set. FIG. 3 shows the outline of a box beam 102 for a front axle assembly 103 of the front axle set, the front and rear axle assemblies being symmetrical about pivot 31.

A clevis 90 extends upwardly from plate 87 and has individual extensions 92 which mount spherical bearing assemblies 94. A pin 96 received in the bearing assemblies couples a tongue 97 of the output shaft of rear hydraulic cylinder 40 to axle assembly 76.

Each axle assembly mounts at its ends the wheels of an axle set. Thus in FIG. 3 front axle set 27 has wheels 104 and 106 mounted on axle assembly 103. Spindles 108 and 110 of the axle assembly mount wheels 104 and 106 and electric motors (not shown) which drive the wheels. The motors become generators during braking.

The axle sets, then, can each tilt about a longitudinal axis to accommodate path irregularities. The axle sets can also tilt substantially more about a transverse axis for access and egress from a pipe and for accommodating irregularities in the paths of the axle sets. This latter accommodation means that each wheel will be able to accommodate about one-quarter of the entire load on the stepping unit regardless of any irregularity under the wheels.

Figure 4:
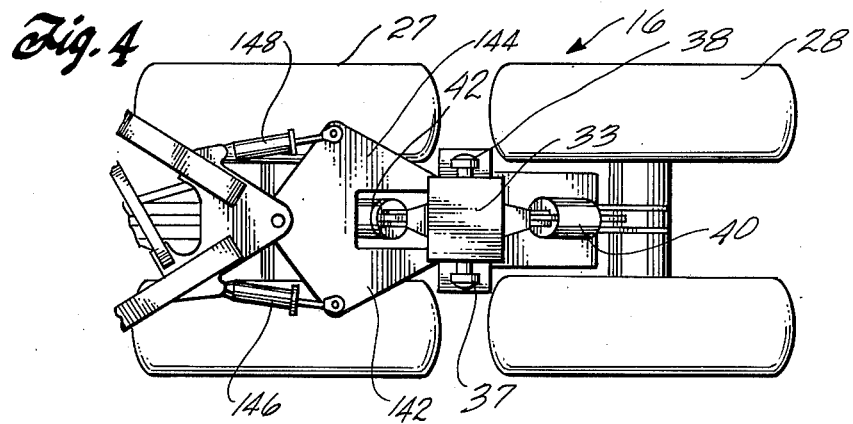
FIG. 4 illustrates a top plan view of the stepper assembly of the present invention.

Continuing the reference to FIGS. 2 and 3, sleeve 33 of the weldment has a box-shaped cross section similar to a box-shaped cross section of stanchion 32. The sleeve receives the stanchion. Clevis ends 109 and 111 of arms 35 and 36 extend forward of the sleeve to receive tongues 112 and 114 of the carriage. Pins 116 and 118 secure the tongues to the clevis ends of the arms. Plate frame work between the arms rigidly ties the arms and the sleeve together. The plate frame work is a symmetrical box section, one side being shown in FIG. 2. This side includes vertical webs 120 and 122, transverse plates 124, 126, 128, 130 and 132, canted brace plate 134, and a second canted plate 136. The transverse and canted plates and vertical webs give the weldment considerable stiffness against bending from moments acting in the vertical. As can be seen in FIGS. 2 and 4, gudgeons 138 on wings 142 and 144 of the top transverse plate 128 of the weldment accept wrist pins which in turn receive eyes of powered shafts of hydraulic turning cylinders 146 and 148. These cylinders anchor on carriage 14. Opposed extension and contraction of the shafts steer the stepper.

As can be seen in FIG. 3, stanchion 32 mounts a cross arm 150 which extends transversely through the stanchion and in turn is pivotally connected to shock absorbers 37 and 38. Each of the shock absorbers has as its energy observing media an elastomer. The upper ends of the shock absorbers connect to sleeve 33 so that vertical loads on the sleeve go through the shock absorbers and the cross arm into the stanchion.

Figure 6:
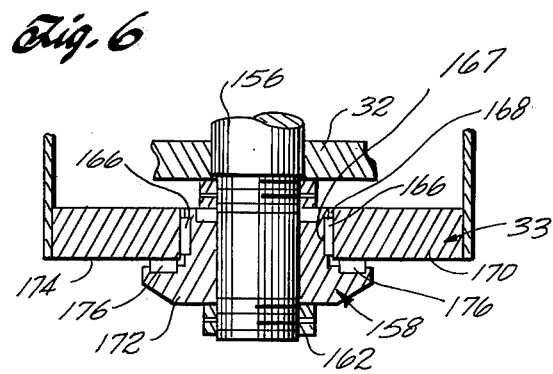
FIG. 6 is a view taken along line 6—6 in FIG. 2 illustrating the slide bearing between the sleeve and the stanchion of the present invention.

There will of course be moments and horizontal loads between the sleeve and the stanchion and yet the stanchion must be capable of movement relative to the sleeve. Moment and horizontal load coupling is provided by upper and lower sets of slide bearing assemblies 44 and 46. As will become apparent, the slide bearing assemblies take out moments about all axes, horizontal forces, and torsional loads (which is a moment about the vertical axis). Upper slide bearing assembly 44 has a cross shaft 156 which mounts at its ends slide bearings 158 and 160. These bearings are held to the cross shaft by lock nuts and bolts 162 and 164. As seen in FIG. 6, for slide bearing 158, the slide bearing has shoes 166 on a shank 167. The shoes bear against the vertical surfaces of a receiving slot 168 in a wall 170 of sleeve 33. The same bearing arrangement exists on the other side of the cross shaft for slide bearing 160.

A head 172 of the slide bearing extends from shank 167 and overrides an external surface 174 of sleeve wall 170. Shoes 176 bear between head 172 and this sleeve wall. A similar head on the opposite end of cross shaft 156 extending over a complementary wall of the sleeve keeps the cross shaft centered in the sleeve. The heads of the slide bearings together with a rigid coupling of the cross shaft to the stanchion load couple the stanchion and sleeve together for loads acting along the axis of the cross shafts, which occur, for example, from the skew loads of steering. Twisting loads about the vertical of the stanchion and sleeve also go between them through the slide bearings.

Similarly, lower bearing assembly 154 has a cross shaft 180 mounted in stanchion 32. Slide bearings 182 and 184 secure onto either end of the cross shaft by lock nuts and washers 186 and 188. The slide bearings here have shoes which mount on shanks of the slide bearings interiorly of their heads and bear against the walls of vertical slots 190 and 192 of sleeve 33, and another set of shoes which mount on the heads and bear against the external surface of opposite walls 194 and 196 of sleeve 33. The opposed heads of the slide bearings embracing opposite walls of the sleeve between them and a rigid connection of the stanchion to the cross shaft centers the sleeve on the stanchion in this lower zone. These heads also function in a load acceptance capacity similar to the heads for the upper slide bearings.

Front and rear hydraulic cylinders 42 and 40 mount respectively to the front and rear ends of the walking beam and to the top of the stanchion. The mount to the stanchion is through clevises 191 and 193 for the front and rear cylinders respectively. The mount at the bottom of the cylinders is through clevises 195 and 90 for cylinders 42 and 40 respectively. The mounts are all through spherical bearings. The clevis mounts of the stanchion are formed from clear through plates welded to the box section of the main portion of the stanchion to form a T-weldment.

Cylinders 40 and 42 are the push-pull type permitting controlled elevation and lowering of each wheel set. The load transmitted to the wheels from the pipe carriage and the weight load of the stepping unit do not pass through the cylinders but instead pass directly through the sleeve and stanchion, bypassing the cylinders. The cylinders are actuated by an operator by merely introducing hydraulic fluid under pressure in a sense to lift or lower the axle set in question. Let it be supposed that it is the rear axle set that is to be raised. Hydraulic fluid is introduced into the hydraulic cylinder and the axle set lifted. This will cause the walking beam to rotate counterclockwise in FIG. 2 about pivot 31. The axle set lowers when the cylinder is energized in the opposite direction. The axle set lowers with hydraulic fluid in the opposite chamber of the cylinder to slow the rate of lowering. The lowering will cause rotation in the opposite direction of the walking beam about pivot 31. The limit of rotation about pivot 31 is shown in FIG. 2 by the angle "α" (alpha) and is about 60°.

Figure 5:
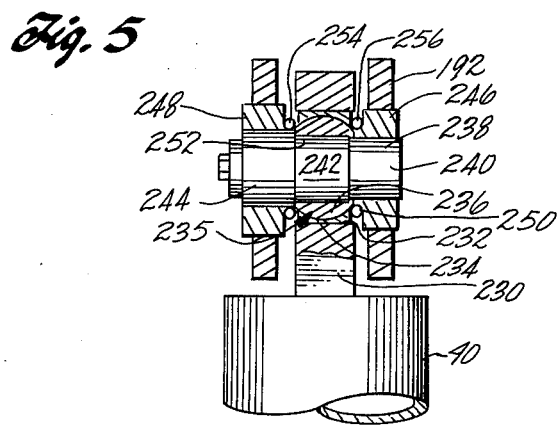
FIG. 5 is a view taken along line 5—5 of FIG. 2 to illustrate a typical universal coupling employed in the stepper assembly of the present invention.

The spherical bearings coupling the cylinders and shock absorbers to the balance of the stepper assembly are similar to those shown in FIGS. 3 and 5. In FIG. 3, the top of shock absorbers 37 and 38 have eyes 198 and 200. A spherical bearing 202 for shock absorber 37 is typical. This bearing has a race 204 within eye 198. Spherical element 206 is in bearing relationship with race 204. The spherical element mounts on a stub shaft 208. The stub shaft is integral with a flange 210 which secures to sleeve 33 as by a ring of fasteners 212. An interior extension 214 of the shaft is received in a hole 216 of the sleeve for good load transmittal to the sleeve. A dust cover 218 caps the end of this spherical bearing assembly. A retainer of a washer and male fastener 220 attach the bearing, its race and the eye to the stub shaft by anchoring to the stub shaft with threads and retaining the spherical element and race between the washer and flange 210. The stub shaft on the opposite side of the stepper unit mounts the upper end of shock absorber 38 in the same manner. Thus an eye of the upper end of the shock absorber receives the race and spherical bearing element of the spherical bearing and the stub shaft in turn is received in a bore of that element. The stub shaft, seen at 222, extends to a flange 224 which secures the shaft to a wall of sleeve 33 through a ring of fasteners 225. An extension 226 receives in a hole 228 of this wall of the sleeve. Extension 226 transmits vertical loads to the sleeve.

The lower end of the shock absorbers mounts to cross arm 150 in much the same manner as the upper end of the shock absorbers mount to the sleeve to provide for some angular movement about two orthogonals between the lower end of the shock absorbers and the cross arm.

FIG. 5 illustrates the coupling of the upper end of the hydraulic cylinders to the stanchion. Clevis 193 receives an end 230 of a powered shaft of hydraulic cylinder 40. This end has a bore 232 in receipt of a race 234 of spherical bearing 235. The spherical bearing has a spherical element 236 received in the race and in turn receiving a stepped cross pin 238. Cross pin 238 has progressively larger diameters 240, 242 and 244 for receipt in a load collar 246, the spherical element, and a load collar 248. The load collars secure in arms of clevis 193. Collar 246 has an annular nose 250 in bearing against spherical element 236. A shoulder 252 between sections 242 and 244 bears on this other end of the spherical element. Stop rings 254 and 256 limit angular displacement between the shaft and the clevis about an axis perpendicular to the paper. A similar mount at the bottom end of the hydraulic cylinders to the clevises on the axle assemblies provides the complementary universal couple at the bottom of the cylinders, which in turn permits some angular movement about the two orthogonals to the axes of the cylinders.

With reference to FIGS. 3 and 6, the load transferring slide bearings that transmit moment, horizontal, lateral and twisting loads between the stanchion and the sleeve will be described in greater detail in the particular of their coupling to the stanchion. Upper cross shaft 156 mounts slide bearings 158 and 160. These bearings are positioned laterally between outside lock washers and nut sets 162 and 164 threaded onto the cross shaft on the outside ends of the slide bearings. The heads of the slide bearings bear through shoes on opposed vertical walls of the sleeve. The sleeve, cross shaft and slide bearing relationship is thus established. Lock washer and nut sets 260 and 262 on threads of cross shaft 156 on the inside of slide bearings 158 and 160 bear against opposed load plates 264 and 266 of the stanchion. Annular recesses 268 and 270 in the slide bearing provide for lateral adjustment of the bearings positions without interference from the inside lock washers and nuts. The inside lock washers and nuts locate and attach the cross shaft on the stanchion. The ability to adjust the slide bearings and the cross shaft with respect to the stanchion permits centering of the stanchion in the sleeve and a determination of the amount of bearing pressure between the slide bearings and the contacted outside wall of the sleeve. The heads of the slide bearings overlying the sides of the sleeve transmit moment loads from the cross shaft to the sleeve and thus between the stanchion and the sleeve. The shanks of the slide bearings transmit dominant moment loads through the walls of the slots in which they ride.

Lower cross shaft 180 cooperates in a similar manner. Lock nut and washer 186 and 188 determine the lateral position of slide bearings 182 and 154 with respect to the walls of the stanchion and secure the cross arm to the stanchion. Interior lock nuts and washers 269 and 271 on threads of the cross shaft orient the cross shaft with respect to the stanchion and attach the cross shaft to the stanchion.

Cross arm 150 is of two spaced apart plates held together by cross bars 274 and 276. The resulting spacing forms clevises of the ends of the arm. An upper surface 278 of the cross arm has a convergent taper towards the center of the arm formed of two ramps. Wedge blocks 280 and 282 engage this surface. The wedge blocks wedge on the ramps and are held together by tie bolts and nuts 284 by being forced by these fasteners tightly against the ramps and against load plates 286 and 288 of the stanchion. Thus the cross bar can be laterally positioned and properly oriented with respect to the ends of the shock absorbers. Once oriented, the tie bolts are tightened to secure the cross arm in place by frictional engagement between the wedge blocks and the load plates.

Access holes 290 and 292 on either side of the sleeve are covered by cover plate sets 294 and 296.

Walking beam 30 has a substantial cross section as can be seen in FIG. 3. Lateral plates 298 and 300 extend the complete transverse dimension of the beam. A lower lateral plate 302 extends the same extent. Vertical fore-and-aft connecting webs 306, 308 and vertical side plates 304 and 310 tie into the lateral plates by welding to complete the structural definition of the beam. As can be seen in FIG. 2, canted plates 312 and 314 define a pocket for the end of the stanchion and sleeve to permit the walking beam to rotate with respect to the sleeve and yet retain the extreme rigidity requisite of the beam. FIG. 2 also shows an opening in plate 300 for passage of the stanchion.

Thus it is apparent that the stepper assembly of the pipe carrying vehicle of the present invention provides an elegantly simple structure which performs its stepping function while allowing the machine to traverse the ground at a relatively high speed and with good uniform loading of the wheels of the vehicle. The walking beam floats about its pivot with respect to the stanchion. This means that grade irregularities in the line of vehicle travel accommodate by pivoting of the beam. Independent transverse oscillating of the axle sets with respect to the walking beam accommodate grade irregularities transverse to the line of travel of the vehicle. Both of these accommodations reduce road imposed loads by reducing the mass of the vehicle which must be moved to pass over road irregularities. The elastomeric shock absorbers sustain vertical load and permit comparatively high vehicle speeds outside the resonant range of the vehicle. They also absorb some of road shock energy to attenuate shock forces on the carriage, the weldment, and a pipe carried by the carriage assembly. The hydraulic cylinders do not have to carry loads except during the stepping operation. The sliding or telescoping of the stanchion in the sleeve permits this isolation of the weldment, carriage and pipe. The slide bearing coupling moments between the axle sets and the weldment permits the telescoping.

The present invention has been described with reference to a certain preferred embodiment. The spirit and scope of the appended claims should not, however, necessarily be limited to the foregoing embodiment.

What is claimed is:

1. In a pipe transporting vehicle an improvement in a stepper assembly which steps into and out of a pipe, the improvement comprising:
    a. a vertical stanchion;
    b. a support stanchion having a vertical sleeve, the sleeve receiving the stanchion;
    c. slide bearing means between the stanchion and the sleeve load coupling the stanchion and sleeve together for horizontal forces and moments about all axes and permitting relative vertical motion between the stanchion and the sleeve;
    d. shock absorber and load transfer means between the stanchion and the support structure for transferring vertical loads between the two and absorbing energy associated with the vertical loads;
    e. a walking beam pivotally mounted on the stanchion about a transverse axis so that each end of the beam can raise and lower with respect to the pivot, the beam extending front-to-rear with respect to the line of motion of the vehicle and having front and rear ends;
    f. front and rear axle set means, each axle set means including wheel means to support the stepper assembly on the front and rear ends of the walking beam, respectively; and
    g. front and rear means to raise and lower the front and rear axle means individually while the wheel means of the remaining axle means rests on the ground.

2. The improvement claimed in claim 1 wherein the front and rear raising and lowering means comprises front and rear power cylinder means for the front and rear axle set means respectively, each power cylinder means being pivotally connected at one of its ends to the stepper assembly on one side of the pivot and pivotally connected at its other end to the walking beam on the other side of the pivot and proximate its associated axle set means, each cylinder being independently actuatable.

3. The improvement claimed in claim 2 wherein the front and rear power cylinder means each attaches to the stepper assembly to the stanchion.

4. The improvement claimed in claim 3 wherein:
    the stanchion has opposed fore-and-aft extending clevis pieces;
    the sleeve has openings passing the clevis pieces of the stanchion; and
    the power cylinders pivotally secure to the stanchion through the clevis pieces.

5. The improvement claimed in claim 3 wherein the front and rear axle means include, respectively, front and rear axle assemblies pivotally connected to their respective ends of the walking beam for oscillatory movement about an axis parallel to the front-to-rear direction.

6. The improvement claimed in claim 2 wherein:
    the walking beam has front and rear trunnions extending along a longitudinal axis which is parallel to the line of motion of the vehicle, the front and rear trunnions being located at the front and rear ends of the walking beam respectively;
    the front and rear axle set means respectively includes front and rear axle assemblies pivotally journaled onto the front and rear trunnions, respectively, for pivotal movement about axes parallel to the line of motion of the vehicle; and
    each axle assembly itself extending transversely to the longitudinal axis of the walking beam and mounting a wheel of its associated wheel means at each of its ends, the wheels being mounts for rotation about a transverse axis and motion of the stepper assembly in the direction of the longitudinal axis.

7. The improvement claimed in claim 6 wherein:
    each axle assembly includes a pair of upstanding clevis pieces; and
    the front and rear power cylinders having one end pivotally secured to the clevis pieces of the front and rear axle assembly, respectively, and the other end secured to the stanchion.

8. The improvement claimed in claim 1 wherein the slide bearing means comprises:
    upper and lower, vertically spaced apart slide bearing sets secured to one of the stanchions or the sleeve;
    upper and lower opposed slots in a wall of one of the stanchions or the sleeve that the slide bearing means are not secured to, the slots slidably receiving the upper and lower slide bearings; and
    a pair of spaced apart heads for each slide bearing set, the heads of each slide bearing set being outside of the slot and in slide bearing relationship with the wall proximate the slot.

9. The improvement claimed in claim 8 wherein each head of each slide bearing has:

a shank extending from the head into the slots; and bearing shoes between the wall proximate the slot and the shank and between the head and the wall it is in bearing relationship with.

10. The improvement claimed in claim 8 wherein each slide bearing set includes a cross shaft securing the heads of that set together, the heads of each slide bearing set being secured to their cross shaft with a threaded connection and the cross shaft having its securement to the stanchion or the sleeve by a threaded connection.

11. The improvement claimed in claim 1 wherein the shock absorber and load transfer means includes:
 a. a pair of the shock absorber and load transfer means;
 b. a cross arm secured in the stanchion and having ends extending transversely thereof;
 c. a pair of slots in the sleeve passing the ends of the cross arm and permitting vertical motion thereof with respect to the sleeve;
 d. a universal bearing securing one end of each of the shock absorber and load transfer means to one of the transversely extending ends of the cross arm opposite the securement of the other shock absorber and load transfer means to the cross arm; and
 e. universal bearings securing the shock absorber and load transfer means to the sleeve in vertical spaced relation to the ends of the cross arm.

12. The improvement claimed in claim 11 wherein the energy absorbing material of the shock absorbers is an elastomer.

13. The improvement claimed in claim 11 including:
 a. ramped surfaces on an edge of the cross arm defined by a pair of ramps converging on the vertical centerline of the stanchion;
 b. a pair of wedge blocks each having an inclined surface complementary to one of the ramps of the cross arm and in engagement with its complementary ramp; and
 c. means to apply a force on the wedge blocks which tends to proximate the wedge blocks and thereby wedge them onto the ramps and into engagement with the stanchion.

14. For use in a pipe transporting vehicle of the type which cradles a large pipe between supporting wheel sets at either end of the vehicle, a stepper assembly for stepping into and out of the pipe which comprises:
 a. a vertical stanchion;
 b. a support structure having a sleeve in receipt of the stanchion;
 c. vertical shock absorber and load transferring means between the support structure and the stanchion to vertically load couple the two together while permitting relative vertical movement between the two;
 d. slide bearing means between the stanchion and the support structure to transfer horizontal forces and moments from one of them to the other of them;
 e. a walking beam pivotally secured to the stanchion at the stanchion's lower end for pivotal movement about an axis transverse to the line of movement of the stepper assembly along a path, the walking beam extending in each fore-and-aft direction from the pivot to define fore-and-aft ends thereof spaced from the pivot;
 f. fore-and-aft trunnions on the fore-and-aft ends of the walking beams and extending along the fore-and-aft axis of the walking beams;
 g. fore-and-aft axle assemblies journaled on the trunnions for pivotal movement about the axis thereof, the axles extending transversely to the fore-and-aft axis;
 h. a wheel mounted on each end of each of the axle assemblies for rotation about axes transverse to the fore-and-aft direction and transport of the stepper assembly parallel to the fore-and-aft direction; and
 i. fore-and-aft power cylinders secured at one end to the stanchion and at the other end to the fore-and-aft ends of the walking beam such that actuation of individual of the cylinders will lift one end of the walking beam and enable the wheels thereat to step while the weight of the stepper assembly and its carried load are supported by the wheels at the other end of the walking beam.

15. The stepper assembly claimed in claim 14 wherein the slide bearing means comprises:
 a. upper and lower slide bearing sets;
 b. each slide bearing set having a pair of heads in sliding bearing with opposed outside surfaces of the sleeve;
 c. a cross shaft for each slide bearing set connecting the heads thereof together and being attached to the stanchion;
 d. a pair of parallel slots in the opposed wall of the sleeve for each pair of heads, the cross shaft of each slide bearing set connecting the heads thereof through the slots; and
 e. means bearing on the walls of the slots to load couple the cross shafts to the stanchion.

16. The stepper assembly claimed in claim 15 including bearing shoes between each head of each slide bearing set and the outside surfaces of the sleeve.

17. The stepper assembly claimed in claim 15 wherein the stanchion has oppositely extending fore-and-aft clevis pieces at the top thereof, the sleeve has openings passing the clevis pieces of the stanchions, and the power cylinders pivotally secure to the stanchion through the clevis pieces.

18. In a pipe transporting vehicle of the type which cradles a large pipe between supporting wheels of supporting axle sets at either end of the vehicle, a stepper assembly for stepping into and out of pipe which comprises:
 a. a vertical stanchion;
 b. a weldment having a sleeve for receipt of the stanchion, a pair of arms extending forward of the sleeve, and means at the forward end of the arms for pivotally coupling about a vertical axis the weldment to a carriage of the transporting vehicle;
 c. vertical load transferring and shock absorber means between the sleeve and the stanchion for transferring vertical loads between the sleeve and the stanchion and for dissipating energy passing from them;
 d. a walking beam pivotally connected to the lower end of the stanchion about an axis transverse to the fore-and-aft direction of the vehicle such that the walking beam extends parallel to the fore-and-aft direction of the vehicle and presents fore-and-aft ends spaced from the pivot;
 e. fore-and-aft axle assemblies pivotally coupled to the walking beam at the fore-and-aft ends thereof, respectively, the pivotal coupling of each of the axle assemblies being about an axis extending in the fore-and-aft direction such that the axle assemblies are capable of tilting with respect to the vehicle;

f. a wheel set for each of the axle assemblies, each wheel set having at least two wheels with the wheels of a set being rotatably mounted at either end of the axle assemblies;

g. upper and lower, vertically spaced apart slide bearing arms between the sleeve and the stanchion to permit relative vertical movement of the sleeve with respect to the stanchion and to transfer horizontal forces and moments about all axes between the two; and h. forward and aft power cylinder means coupled between the stanchion and the fore-and-aft ends of the walking beam, respectively, each power cylinder being independently actuatable from the other to permit the lifting and lowering of the end of the walking beam to which it is attached while the wheels at the end of the walking beam attached to the other cylinder remain on the ground.

19. The stepper assembly claimed in claim 18 wherein the load transfer and shock absorbing means are coupled to the sleeve through universal bearings and coupled to the stanchion through universal bearings.

20. The stepper assembly claimed in claim 19 including a cross arm attached to the sleeve and extending in opposite directions therefrom, a pair of slots in the sleeve passing the ends of the cross arm, the load transferring and shock absorber means attaching to the stanchion through the cross arm.

21. The stepper assembly claimed in claim 20 including a pair of parallel and fore-and-aft extending clevis pieces attached to the stanchion at the upper end thereof, each clevis piece extending completely through the sleeve and out the fore-and-aft ends thereof to define a clevis half at each fore-and-aft end, slots in the stanchion passing the ends of the clevis pieces, the ends of the power cylinders attached to the sleeve being attached at the clevis pieces; and fore-and-aft clevises attached to the fore-and-aft axle assemblies, the other ends of the power cylinders being attached to the axle assemblies at these clevises.

22. The stepper assembly claimed in claim 21 wherein the power assemblies attach at each of their ends through universal bearings to the clevises.

* * * * *

UNITED STATES PATENT AND TRADEMARK OFFICE
CERTIFICATE OF CORRECTION

PATENT NO. : 4,068,764

DATED : January 17, 1978

INVENTOR(S) : Frederick W. Loeber and Louis Russo

It is certified that error appears in the above—identified patent and that said Letters Patent are hereby corrected as shown below:

In the Claims: Claim 3, column 10, line 17, after "assembly" insert --by attachment--.

Signed and Sealed this

Fourteenth Day of November 1978

[SEAL]

Attest:

RUTH C. MASON
*Attesting Officer*

DONALD W. BANNER
*Commissioner of Patents and Trademarks*